United States Patent
Tiwari et al.

(10) Patent No.: US 10,572,531 B1
(45) Date of Patent: Feb. 25, 2020

(54) PREDICTIVE SESSION-BASED SEARCH ENGINE

(71) Applicant: Amazon Technologies, Inc.

(72) Inventors: Abhinav Tiwari, Hyderabad (IN); Dhwanit Gupta, Hyderabad (IN); Siddharth Saxena, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 15/793,803

(22) Filed: Oct. 25, 2017

(51) Int. Cl.
*G06F 16/14* (2019.01)
*G06F 16/242* (2019.01)
*G06F 16/245* (2019.01)
*G06F 16/435* (2019.01)

(52) U.S. Cl.
CPC .......... *G06F 16/435* (2019.01); *G06F 16/144* (2019.01); *G06F 16/2423* (2019.01); *G06F 16/245* (2019.01)

(58) Field of Classification Search
CPC .. G06F 16/435; G06F 16/144; G06F 16/2423; G06F 16/245
See application file for complete search history.

(56) References Cited

U.S. PATENT DOCUMENTS

| | | | | |
|---|---|---|---|---|
| 9,020,142 | B2* | 4/2015 | Kosiba | G06Q 10/04 379/266.08 |
| 9,307,085 | B1* | 4/2016 | Hanson | H04M 3/5235 |
| 9,832,315 | B1* | 11/2017 | Jayapalan | H04M 3/5233 |
| 10,135,700 | B2* | 11/2018 | Lugiai | H04L 67/36 |
| 2002/0147766 | A1* | 10/2002 | Vanska | G06F 21/6245 709/203 |
| 2003/0212654 | A1* | 11/2003 | Harper | G06Q 30/02 |
| 2004/0162800 | A1* | 8/2004 | Reid | G06Q 30/02 |
| 2012/0324375 | A1* | 12/2012 | Mathews | G06F 16/95 715/760 |
| 2014/0355748 | A1* | 12/2014 | Conway | H04M 3/523 379/265.1 |
| 2017/0104875 | A1* | 4/2017 | Im | H04M 3/5191 |
| 2018/0063327 | A1* | 3/2018 | Eisner | H04M 3/5183 |
| 2018/0063328 | A1* | 3/2018 | Eisner | H04M 3/5133 |
| 2018/0158070 | A1* | 6/2018 | Moore | G06Q 30/016 |

* cited by examiner

*Primary Examiner* — Jorge A Casanova
(74) *Attorney, Agent, or Firm* — Knobbe, Martens, Olson & Bear, LLP

(57) ABSTRACT

Systems and methods are described for providing a predictive session-based search engine. A predictive session-based search engine may identify and pre-fetch data from various data sources that is likely to be accessed during a particular session. Data sources may include other search engines, databases, web servers, and other sources of information. A plug-in controller architecture, which may include templates, computer-executable instructions, application programming interface (API) calls, or other information that enables access to a particular data source, may be used to allow the predictive session-based search engine to obtain data from the data sources. The predictive session-based search engine may store and index the data it obtains, and may answer search queries during the session with data that is stored and indexed locally rather than retrieving data from the original sources. The predictive session-based search engine may similarly process updates to the session data using the plug-in architecture.

20 Claims, 7 Drawing Sheets

PREDICTIVE SESSION-BASED SEARCH ENGINE

BACKGROUND

Generally described, computing devices and communication networks can be utilized to exchange information. In a common application, a computing device can request information from another computing device or devices via a communication network. For example, a provider of networked computing services can utilize a software application, such as a web browser application or a customer relationship management ("CRM") application, to request information that may be relevant to a particular online transaction or session, such as a call to a technical support center or customer service center. The information relating to a particular session may only be relevant for a limited time, due to the changing nature of the information, the characteristics of the session, or other factors.

Information relevant to a particular session may be available from a variety of sources, and these sources may implement various interfaces to facilitate information retrieval. The information relevant to a particular session may also be a small subset of the information made available by a particular source.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
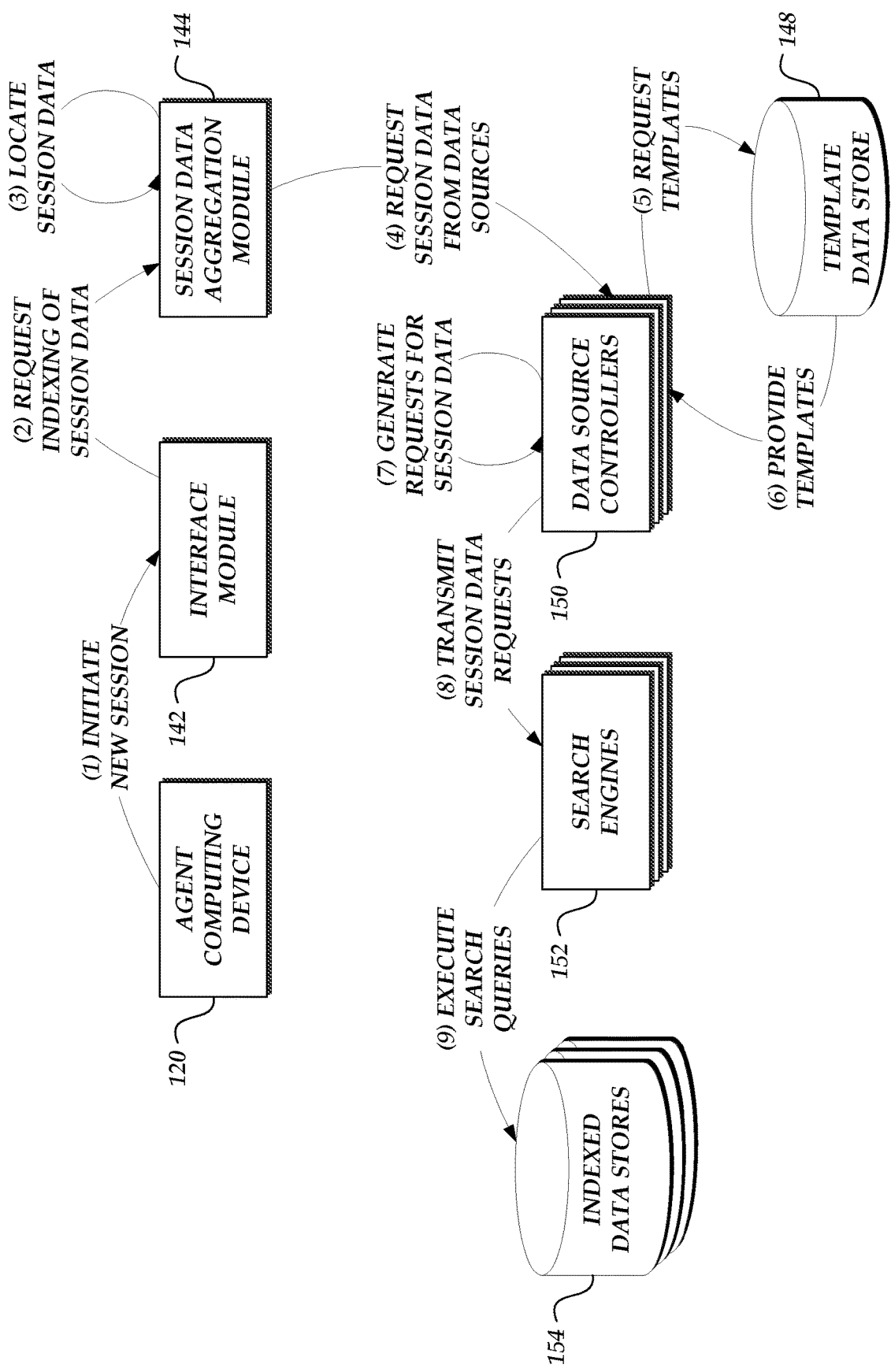
FIGS. 1A-1C are block diagrams depicting example interactions for pre-fetching and indexing session information, and for providing session-specific search results based on the session information, in accordance with aspects of the present disclosure.

Generally described, aspects of the present disclosure relate to search engines. More specifically, aspects of the present disclosure are directed to systems, methods, and computer-readable media for implementing a predictive session-based search engine. Illustratively, a search engine may facilitate access to data stores containing large amounts of information, such as databases containing millions of records, in which relevant information may be found but a methodical search would be impractical. Different information in such data stores may be relevant at different times, and search engines may be used to reduce the time and effort required to locate relevant information.

However, information stored in data stores may be of such quantity, or may be organized in such a fashion, that it cannot be obtained in a reasonable timeframe even with the assistance of a search engine or engines. For example, a customer service agent may require access to information regarding a caller to a customer service center, and such information may be stored in various data stores, including (e.g.) an account information database, payment information database, purchase history database, subscription information database, and the like. These databases may contain hundreds of millions of records that are not relevant to the customer service call and will not be accessed during the call, and locating the relevant records among multiple databases may be slow and cumbersome. For example, a customer service agent may be required to look up a customer identifier in a first database, use the customer identifier to obtain relevant account information in a second database, use the account information to obtain transaction information from a third database, and so forth, all while the caller is waiting on the line. Further, the amount of data in these large databases may cause them to respond more slowly and consume more computing resources when executing search queries for individual records.

To address these technical problems, a provider of networked computing services may implement a predictive session-based search engine. As described below, a predictive session-based search engine may identify information that is likely to be accessed during a session, and may retrieve and index that information in an ad-hoc data store. The predictive session-based may then respond more quickly, and with lower consumption of computing resources, when an agent of the provider issues search queries for data relevant to the session. In some embodiments, the predictive session-based search engine may further enable updating session-related data and writing updated data to the sources from which the data was originally obtained.

A "session," as used herein, may generally refer to an interaction or set of interactions involving, for example, a caller to a customer service center, a participant in an online chat, a user of an online service, or other interactions that can be grouped into distinct sets. In some embodiments (e.g., where the session involves a telephone call or logging into a web site), a session may have an explicit start and end. In other embodiments, the start or end of a session may not be explicit, or may be determined according to various factors (e.g., a length of time since the most recent interaction). Additionally, in some embodiments, a session may refer to interactions between an agent and the predictive session-based search engine, rather than interactions between the agent and other parties.

Although examples provided herein describe usage of a predictive session-based search engine in a call center, it will be understood that the present disclosure is not limited to any particular application of a predictive session-based search engine. For example, embodiments of the present disclosure include using a predictive session-based search engine to facilitate access to information regarding an entertainment program that is currently being consumed, a game or game level that is currently being played, a current event, sporting event, news story, or any other condition for which a particular subset of information in a large data store or stores can be predicted as being temporarily relevant.

It will be understood that the predictive session-based search engine described herein addresses a technical problem that specifically arises in the realm of computer networks, and in particular improves the performance of a computing device at providing relevant information in response to search queries. By implementing a predictive session-based search engine, a provider of networked computing services may reduce the amount of computing resources needed to search for and obtain relevant information from large data stores, and may improve the responsiveness of computing systems that provide such information. It will further be understood that the performance of a computer that implements aspects of the present disclosure will be improved, especially with regard to latency and responsiveness in providing relevant search results, relative to the performance of an otherwise identical computer that does not implement aspects of the present disclosure. The present disclosure is thus understood to be an improvement to computing technology.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1B:
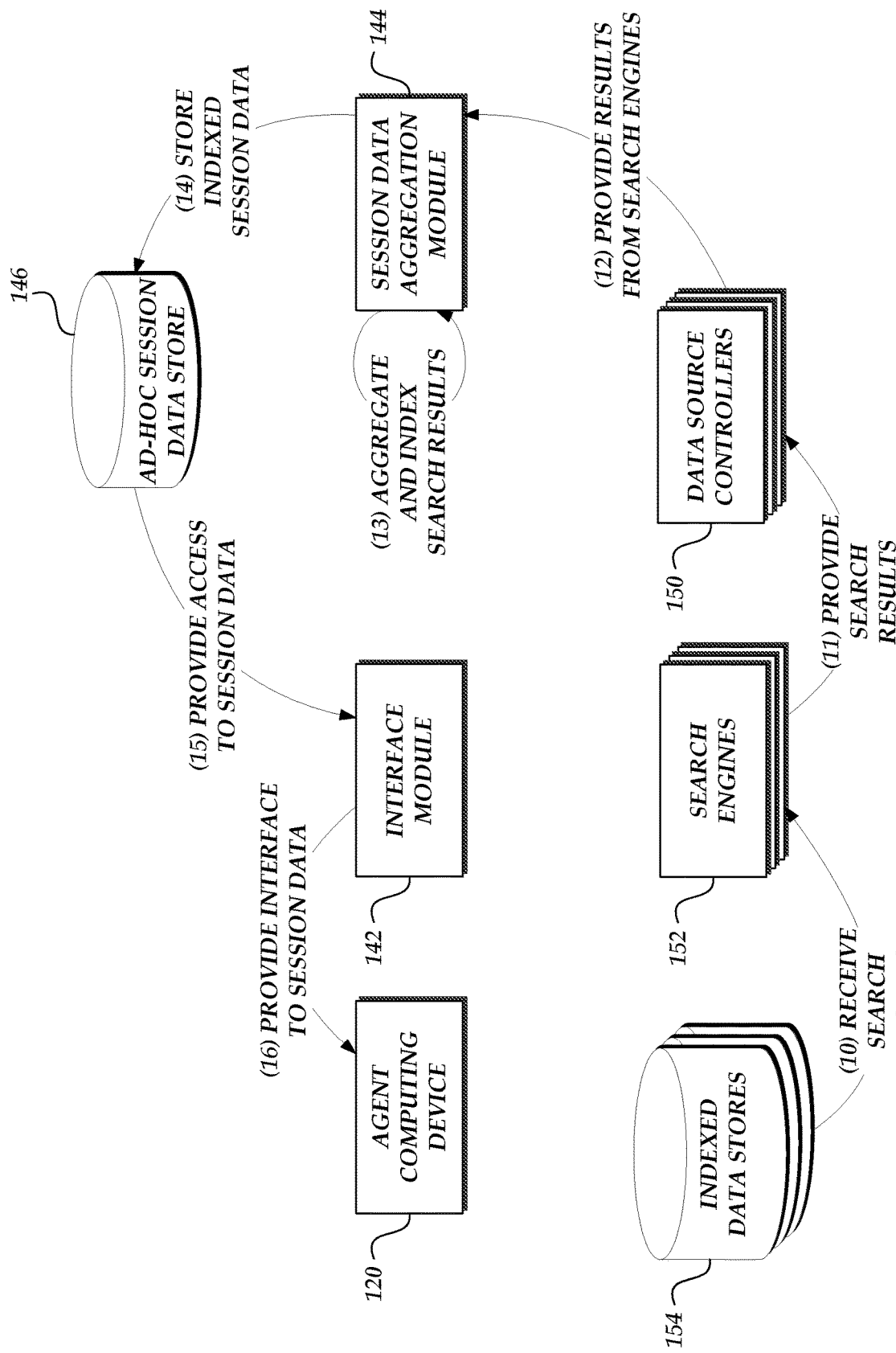
Figure 1C:
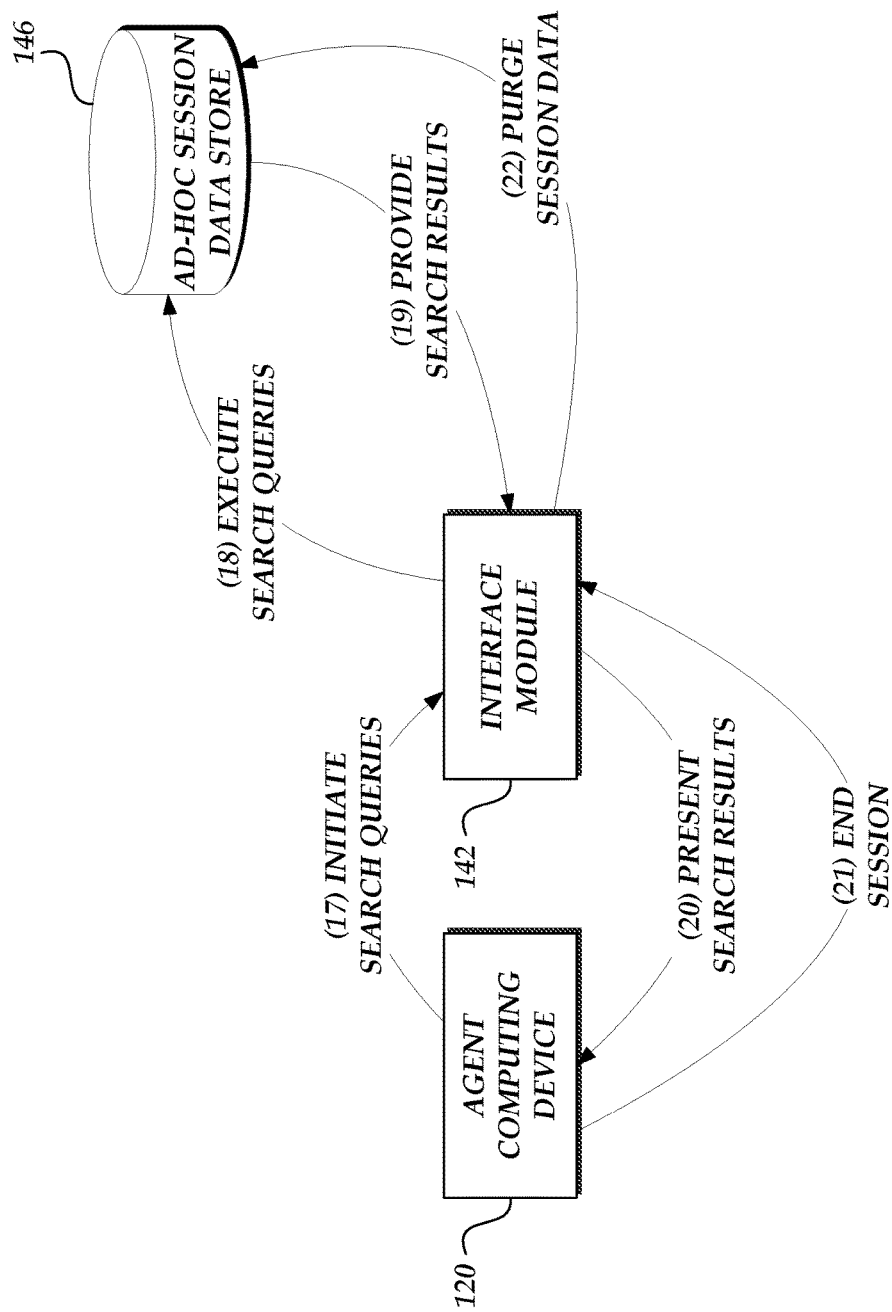

FIGS. 1A-1C are block diagrams depicting example interactions for pre-fetching and indexing session-specific information, and for providing search results based on session-specific information, in accordance with aspects of the present disclosure. Some or all of the example interactions depicted in FIGS. 1A-1C may be carried out, for example, by a predictive session-based search engine, as described in more detail below with reference to FIG. 2.

Turning now to FIG. 1A, at (1), an agent computing device 120 may initiate a new session. In some embodiments, the agent computing device 120 may be a device utilized by a customer service agent in a customer service center, and may initiate the session by providing an account identifier, customer identifier, or other information associated with a caller. In other embodiments, the agent computing device 120 may be an interactive voice recognition ("IVR") system that initiates a new session based on information obtained from a caller, or may be a device that initiates a new session based on a characteristic of the client or the call, such as a telephone number from which the call is placed. In further embodiments, a client computing device may initiate a session by transmitting a request to the agent computing device 120. For example, the agent computing device 120 may be a networked server for an online game or entertainment service, and a player of the online game may initiate a new session by logging into the agent computing device 120 from a client computing device.

Figure 2:
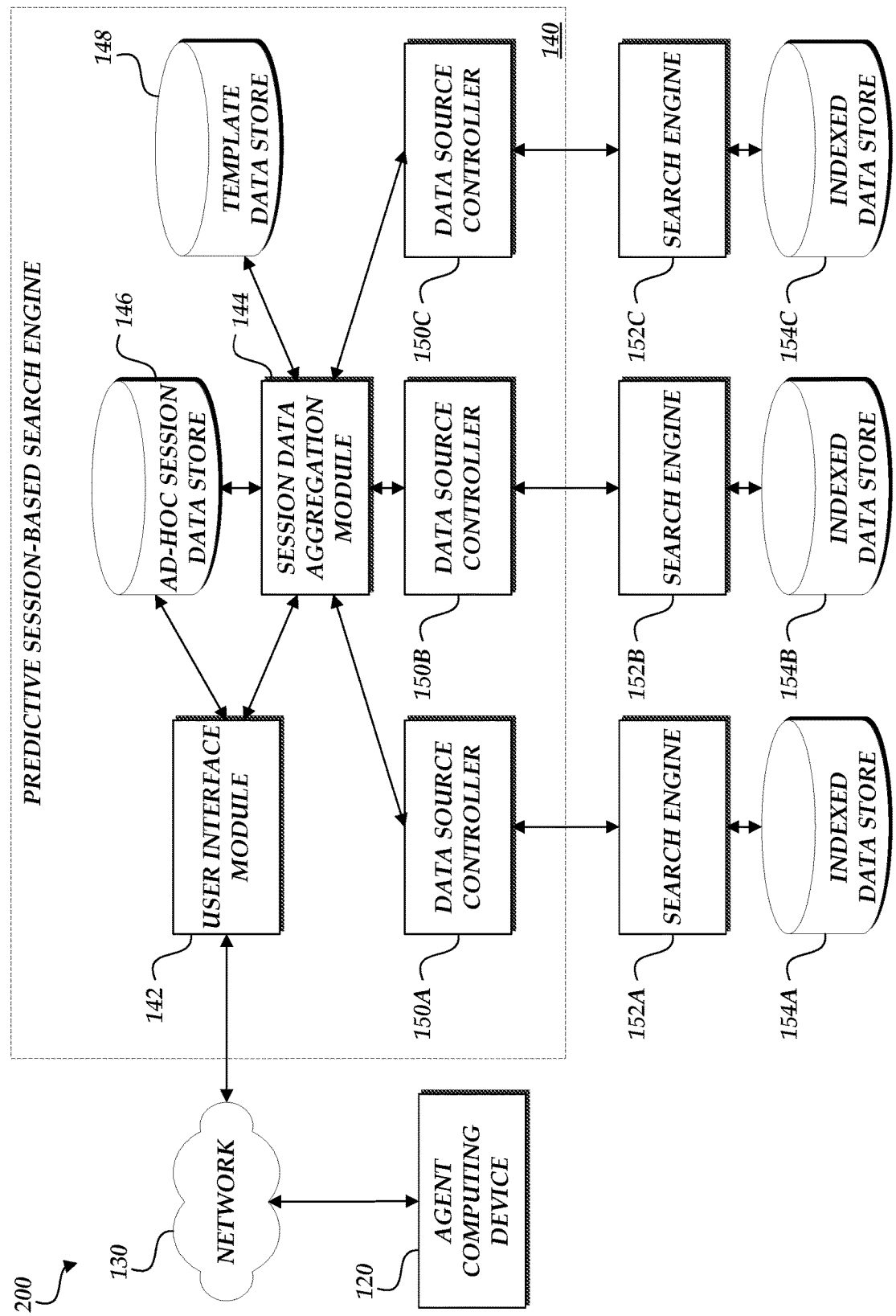
FIG. 2 is a functional block diagram depicting an example network environment for implementing a predictive session-based search engine in accordance with aspects of the present disclosure.

The agent computing device 120 may communicate with an interface module 142 of a predictive session-based search engine (e.g., the predictive session-based search engine 140 depicted in FIG. 2) to initiate the new session. The interface module 142, in various embodiments, may provide a user interface, an application programming interface ("API"), or another interface that enables the agent computing device 120 to initiate the new session.

At (2), the interface module 142 may request that a session data aggregation module 144 obtain and index information that is likely to be accessed during the session. In some embodiments, the interface module 142 may provide information associated with the session to facilitate identification and location of relevant information. For example, the interface module 142 may receive from the agent computing device 120 a session key that authenticates the session. A session key may generally be any information that can be used to identify a record, or a relationship between records, in a data source. Examples of a session key include, but are not limited to, an account identifier (e.g., an account number or telephone number), transaction identifier (e.g., a receipt or a log entry), client identifier (e.g., a name, username, or other personally identifying information), payment method identifier (e.g., a credit or debit card number), subscription identifier (e.g., information identifying a service to which the client is subscribed), or other such information. In some embodiments, a session key may correspond to an index of a relational database or other data source where information likely to be accessed during the session may be found. In other embodiments, the interface module 142 may obtain information associated with the session from another source. For example, the interface module 142 may obtain audio or video information associated with the session (e.g., audio of the caller's voice) and may process this information to identify characteristics of the session (e.g., that the call or session relates to a technical support issue, or that the caller is requesting that a particular transaction be reversed).

At (3), the session data aggregation module 144 may locate session data that is likely to be accessed during the session. In some embodiments, the session data aggregation module 144 may determine a set of session data that is likely to be accessed. For example, the session data aggregation module 144 may determine, based on session keys or other information, that a customer service agent is likely to access account information associated with a particular account ID, recent transactions associated with the account ID, a payment method or methods associated with the account ID, and the like. In some embodiments, the session data aggregation module 144 may determine the session data based on a previous session or sessions, such as a previous session involving the same customer ID. In other embodiments, the session data aggregation module 144 may access a table or other data store that relates session keys to session data likely to be accessed. For example, a table may indicate that subscription information, payment method information, and account information are likely to be accessed when a session involves an account ID having particular characteristics, such as a recently expired subscription. In such embodiments, the session data aggregation module 144 may identify session data based on a property or properties of the session.

In some embodiments, a machine learning model may be used to identify session data that is likely to be accessed during the session, and may be trained on previous sessions that have similar characteristics to the current session. For example, a machine learning model may be trained to recognize sessions in which a caller is requesting a change to a subscription, and may thus identify the session data that is likely to be accessed in that scenario. As a further example, a machine learning model may recognize that sessions involving a particular account ID frequently access the account's payment history. In other embodiments, a machine learning model may evaluate the likelihood that a particular set of data will be accessed, the performance improvements associated with prefetching the data, and the performance costs associated with prefetching the data, to determine whether the particular set of data should be included in the session data and obtained in advance.

The session data aggregation module 144 may also, in some embodiments, locate and identify one or more data sources from which all or part of the session data can be obtained. For example, having determined that the session data includes information regarding recent transactions, the session data aggregation module 144 may identify a database that stores transaction records. In some embodiments, all or part of the session data may be obtainable from multiple data sources, and the session data aggregation module may determine a set of data sources from which to obtain the session data. For example, both a subscription database and an account database may contain information regarding the subscriptions associated with a particular account. The session data aggregation module 144 may determine that it would be more efficient to obtain the subscription-related portion of the session data from the account database (e.g., because other session data is already being obtained from the account database, or because the subscription database is not indexed by account ID and would be slower to respond). The session data aggregation module 144 may thus determine a set of data sources based at least in part on characteristics of the data sources, such as response times, whether the data source has an index, whether the data source is indexed on a particular field, and so forth. In other embodiments, the session data aggregation module 144 may transmit the full request for session data to the data source controllers 150, and the individual data source controllers 150 may determine whether to generate and execute a query in response to the request. The interaction at (3) may thus be omitted, or may be carried out by the data source controllers 150 after the interaction at (4).

At (4), the session data aggregation module 144 may request that one or more data source controllers 150 obtain the session data. Illustratively, each of the data source controllers 150 may provide an interface to a particular data source, such as a search engine 152, that contains at least a portion of the session data. In some embodiments, as described in more detail below, a data source controller 150 may generate queries that are executed by a search engine 152 to retrieve data from an indexed data store 154. For simplicity, interactions between a single data source controller 150 and corresponding search engine 152 will be described below, although it will be understood that aspects of the present disclosure include any number of data source controllers 150 and corresponding data sources.

Although FIG. 1A depicts data source controllers 150 that provide interfaces to search engines 152, it will be understood that a data source controller 150 may provide an interface to any type of data source. For example, a data source controller 150 may provide an interface to a web-based data source, and may issue requests for data using the Hypertext Transport Protocol ("HTTP") methods. As another example, a data source controller 150 may provide an interface to a relational database, and may issue requests for data using Structured Query Language ("SQL") commands. Still further, a data source controller 150 may access a data source by making calls to an application programming interface ("API"). In some embodiments, data source controllers 150 may be implemented in software, and may be dynamically created and destroyed as needed. In other embodiments, a single data source controller 150 may be configured to obtain data (and may obtain data) from a number of different data sources. In further embodiments, data source controllers 150 may be implemented using a plug-in architecture. The predictive session-based search engine may thus incorporate new or modified data sources simply by creating or modifying data source controllers 150, without the need to modify or update other elements of the system.

At (5), the data source controller 150 may request a template from a controller data store 148. Illustratively, a template may include query formats, commands, computer-executable instructions, or any combination thereof that enables the retrieval of session data from a data source. For example, the template may include computer-executable instructions that cause a search engine 152 to execute a search query, and may include a template for populating the search query with a session key or other identifier. As a further example, the template may include SQL commands that cause retrieval of session data from a relational database. At (6), the template data store 148 may provide the requested template. In various embodiments, a template may correspond to a particular data source or may be associated with a number of data sources that have a common or similar interfaces.

At (7), the data source controller 150 may generate a request to obtain the portion of the session data that is stored in the data source associated with the controller, using the template and the session key or other information obtained during session authentication. As described above, the request for session data may include one or more search queries, API calls, computer-executable instructions, HTTP GET commands, or other commands that cause a data source to provide requested data. At (8), the data source controller 150 may transmit the session data request to the corresponding data source, which in the illustrated embodiment is a search engine 152, and at (9) the data source may implement the request (e.g., by executing a search query on an indexed data store 154).

Turning now to FIG. 1B, at (10), the search engine 152 may receive search results from the indexed data store 154, and at (11) the search engine 152 may provide the search results to the data source controller 150. The search results may represent all or part of the session data, depending on the number of data source controllers 150. In some embodiments, In some embodiments, the search engine 152 and indexed data store 154 may be combined or omitted, and some or all of the interactions at (8)-(11) may thus be combined or omitted. For example, a data source may be a server that algorithmically generates software license keys, and thus may generate the requested session data rather than retrieving it from a data store at (9)-(10). As a further example, a data source controller 150 may interface directly with an indexed data store 154, and the interactions at (8) and (11) may thus be omitted. In other embodiments, the interactions at (8)-(11) may be repeated, and a data source controller 150 may transmit multiple session data requests to a single data source. For example, the data source controller 150 may transmit a request to an account information database to obtain a first record having a particular account ID, and the first record may include information that identifies family members and associated account IDs. The data source controller 150 may then transmit a second request to the account information database to obtain account records associated with family members. In various embodiments, the data source controller 150 may request a different template and generate a further request for session data from a different data source.

At (12), the data source controller(s) 150 may each provide the search results (or other session data) that they received, and at (13) the session data aggregation module 144 may aggregate the obtained search results into a full set of session data. In some embodiments, the interactions at (4)-(12) may be carried out iteratively or recursively. For example, as described above, a data source controller 150 may obtain a search result, such as an account ID that is linked to other accounts, that enables identification of more data that is likely to be accessed during the session. The session data aggregation module 144 may thus process the obtained data to identify the additional data that is likely to be accessed, and may repeat the interactions at (4)-(12) to obtain the additional data. In various embodiments, the additional data may be obtained from the same data source (s) as the original data, or from a different data source or sources. In some embodiments, the session data aggregation module 144 may index the data obtained from the data sources.

In other embodiments, the data source controllers 150 may each carry out the interactions at (4)-(12) in parallel. In such embodiments, each data source controller 150 may independently determine whether to execute a search query and, if so, what portion of the requested session data to provide. The session data aggregation module 144 may then at (13) remove any redundant search results that were provided by more than one data source controller 150.

At (14), the session data aggregation module 144 may store the indexed session data in an ad-hoc session data store 146. In some embodiments, the ad-hoc session data store 146 may be a virtual storage device that is dynamically created to store the indexed session data. In other embodiments, the ad-hoc session data store 146 may have a fixed capacity, which may be taken into account at (3) when identifying the session data to pre-fetch. For example, the session data aggregation module 144 may prioritize pre-fetching of data that is highly likely to be accessed, such as a list of recent transactions, and may assign a lower priority to pre-fetching older transactions or other data that is less likely to be accessed. In further embodiments, the available capacity of the ad-hoc session data store 146 may be considered when identifying the session data to pre-fetch.

In some embodiments, the ad-hoc session data store 146 effectively serves as a cache for data that is likely to be accessed during the session, and provides faster access to the session data relative to the speed at which the data may be accessed by querying the original data sources. The predictive session-based search engine thus improves the performance of a computing device, as discussed above, by enabling faster execution of search queries during the session and reducing delays in response time. In further embodiments, the ad-hoc session data store 146 may be implemented as an in-memory cache, or may be implemented using higher-speed storage technologies such as solid state devices.

At (15), the ad-hoc session data store may provide access to the session data for the interface module 142, which at (16) may provide an interface that allows the agent computing device 120 (or, in some embodiments, other computing devices) to perform queries and obtain some or all of the session data. In some embodiments, the interaction at (16) may precede some or all of the interactions at (1)-(15). For example, the interface module 142 may provide a query interface prior to the start of the session, and may initially process queries for session data by obtaining the requested data from the original data sources. The interface module 142 may then silently (i.e., without notice to the agent) switch to processing queries by obtaining data from the ad-hoc session data store 146 once the interaction at (15) has been completed.

In some embodiments, the interface module 142 may implement a cache architecture, in which the interface module 142 initially queries the ad-hoc session data store 146 for data and treats any requests that the ad-hoc session data store 146 cannot fulfill as a "cache miss." Queries sent from the interface module 142 may thus cause all or part of the interactions at (2)-(15) to be repeated in the event that a query seeks data that was not previously identified as likely to be accessed. In further embodiments, as described above, a machine learning model may be used to determine whether the session data prediction should be updated, or whether a request for data not included in the session data prediction does not occur frequently enough to justify prefetching that data.

Turning now to FIG. 1C, at (17), the agent computing device 120 may initiate queries for data related to the current session, and at least some of these queries may be fulfilled by the interface module 142 by obtaining and providing session data from the ad-hoc session data store 146. At (18), the interface module 142 may execute search queries against the ad-hoc session data store 146, and at (19) the ad-hoc session data store 146 may provide search results. In some embodiments, as described above, the requested data may not be stored in the ad-hoc session data store 146, and the interaction at (19) may instead be an indication that the requested data is not available. In further embodiments, the interface module 142 at (15) may receive an indication of what data is available from the ad-hoc session data store 146. The interface module 142 may thus only carry out the interaction at (18) if it knows that the requested data is available from the ad-hoc session data store 146, and may carry out another interaction (e.g., querying the original data sources, or requesting that the session data aggregation module 144 obtain the requested data and store it in the ad-hoc session data store 146) instead. In such embodiments, the interface module 142 may indicate or store that the ad-hoc session data store 146 could not fulfill one of the data requests during the session, which may inform later determinations of what to include in session data predictions. At (20), the interface module may present search results to the agent computing device 120. It will be understood that the interactions at (18)-(20) may be carried out any number of times during the session.

At (21), the agent computing device may indicate that the current session has ended. In some embodiments, the end of the session may be explicit and may be tied to an event, such as the end of a telephone call that started the session. In other embodiments, the agent computing device 120 or the interface module 142 may determine that the session has ended based on various criteria (e.g., if no queries have been received for a specified period of time). In embodiments where the interface module 142 determines the end of a session, the interaction at (21) may be omitted.

At (22), in some embodiments, the interface module 142 may indicate to the ad-hoc session data store 146 that the session data is no longer needed and can be purged. In some embodiments (e.g., when the ad-hoc session data store 146 is a virtual storage volume or is stored in memory, as described above), the ad-hoc session data store 146 itself may be deleted. In other embodiments, the session data may be deleted, marked as expired or invalid, or otherwise identified as no longer current.

In some embodiments, the agent computing device 120 may request that all or part of the session data be updated, or may request that new data be stored. For example, the caller may indicate that a mailing address associated with an account has changed, that a payment method associated with the account has changed, that a family member is to be added to the account, and so forth. In such embodiments, the interface module 142 may write information to the ad-hoc session data store 146. In various embodiments, the session data that is modified in this manner may be written to the original data sources at the time of modification, or may be written to the original data stores as it is purged from the ad-hoc session data store 146 at (22). For example, the ad-hoc session data store 146 or the interface module 142 may indicate to the session data aggregation module 144 that session data has been modified. The session data aggregation module 144 may determine the original data source(s) from which the session data was originally contained, and may request that the data source controller(s) 150 write the modified session data to the original data source(s). In some embodiments, the controller for a particular data source may contain further computer-executable instructions (or other information as described above) for writing data to the data source, and the data source controller 150 may execute those instructions to write to the data source. In other embodiments, the data source controller 150 may utilize different controllers for reading and writing data. The session data aggregation module 144 may thus request that the data source controller(s) 150 write the modified data, and the data source interface modules may carry out interactions similar to those at (5)-(9) but for writing data rather than reading it.

It will be understood that the interactions described with reference to FIGS. 1A-1C are provided for purposes of example, and that many other interactions and variations are within the scope of the present disclosure. For example, the interface module 142 may interact directly with search engines 152 or data source controllers 150 to obtain data that is not available from the ad-hoc session data store 146, as described above. As a further example, the interaction at (22) may be omitted, and the ad-hoc session data store 146 may instead purge any data that has not been accessed for a specified time interval. Still further, the interface module 142 may, at (18), interact with the session data aggregation module 144 rather than the ad-hoc session data store 146, and the session data aggregation module 144 may determine whether to fulfill the search query with data from the ad-hoc session data store 146 or from the original data sources. FIGS. 1A-1C are thus understood to be illustrative and not limiting.

FIG. 2 is a functional block diagram depicting an example network environment 100 for implementing a predictive session-based search engine in accordance with aspects of the present disclosure. It will be understood that the network environment 100 may include more (or fewer) elements than those shown in FIG. 2. It is not necessary, however, that all of these elements be shown in order to provide an enabling disclosure.

In the illustrated embodiment, the network environment 100 includes an agent computing device 120 and a predictive session-based search engine 140, which communicate with each other via a network 130. The predictive session-based search engine 140 may further communicate with a number of search engines 152A-C, which enable retrieving data from corresponding indexed data stores 154A-C. Although three search engines 152A-C are depicted in FIG. 2, it will be understood that the present disclosure is not limited to any particular type or quantity of data sources. In some embodiments, the predictive session-based search engine 140 may communicate with the search engines 152A-C via the network 130 or another network.

The agent computing device 120 may illustratively be any computing device that implements aspects of the present disclosure, such as initiating sessions with the predictive session-based search engine 140. Examples of agent computing devices 120 include, but are not limited to, devices such as desktop computers, server computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor.

The network environment 100 may further include a network 130. The network 130 may illustratively be any wired or wireless network, or combination thereof. In addition, the network 130 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or some other type of wireless network. The network 130 may use protocols and components for communicating via the Internet or any of the other aforementioned types of networks. In some embodiments, the network 130 may be omitted, and the agent computing device 120 and the predictive session-based search engine 140 may communicate directly with each other.

The network environment 100 may further include a predictive session-based search engine 140, which is described in more detail below with reference to FIG. 4. In some embodiments, the agent computing device 120 and the predictive session-based search engine 140 may be implemented as a single computing device, or may be distributed across multiple computing devices.

The predictive session-based search engine 140 may include an interface module 142, which may be any combination of computing hardware and software that carries out aspects of the present disclosure as described above. For example, the interface module 142 may generate and provide user interfaces, application programming interfaces, or other interfaces to enable interaction with the predictive session-based search engine 140. The predictive session-based search engine may further include a session data aggregation module 144, which may similarly carry out aspects of the present disclosure as described above and with reference to FIGS. 3A-3B below.

The session data aggregation module 144 may communicate with an ad-hoc session data store 146, which may illustratively store session data, and a controller data store 148, which may illustratively store data source controllers. In some embodiments, the data store 146 or 148 may be external to the predictive session-based search engine 140, and the session data aggregation module 144 may communicate with the data store 146 or 148 via the network 130 or via another network.

The data stores 146 and 148 (and indexed data stores 154A-C) may illustratively be any non-transient computer-readable media, including but not limited to hard drives, solid state devices, flash memories, EEPROMs, or other storage media accessible to or by a device such as an access device, server, or other computing device. In various embodiments, the data stores 146 and 148 may be implemented as a database, a database server, a component of another server or service (e.g., the agent computing device 120), or may be implemented as more or fewer data stores than are depicted in the example embodiment. For example, the ad-hoc session data store 146 and the controller data store 148 may be combined into a single data store. A data store may also or alternatively be distributed or partitioned across multiple local and/or remote storage devices as is known in the art without departing from the scope of the present disclosure. In further embodiments, as described above, a data store 146 or 148 may include or be embodied in a data storage web service.

The session data aggregation module 144 may further communicate with any number of data source controllers, such as the data source controllers 150A-C depicted in FIG. 2. As described above, the data source controllers 150A-C may each communicate with a respective data source, such as search engines 152A-C. In various embodiments, the data source controllers 150A-C may have one-to-one relationships with data sources, one-to-many relationships, many-to-one relationships, or many-to-many relationships. In some embodiments, as described above, the session data aggregation module 144 may determine which combination of data source controllers 150A-C and search engines 152A-C will be utilized to retrieve session data. In other embodiments, individual data source controllers 150A-C may determine whether to retrieve all or part of the session data.

The search engines 152A-C may generally be any computing devices that facilitate retrieval of data from data stores (e.g., the indexed data stores 154A-C). In some embodiments, as described above, one or more of the search engines 152A-C may be omitted, and the corresponding data source controller 150A-C may communicate directly with an indexed data store 154A-C. In other embodiments, one or more of the indexed data stores 154A-C may be omitted. As discussed above, the illustrated embodiment depicts search engines 152A-C as examples of a data source from which session data can be obtained, and many other data sources are within the scope of the present disclosure.

Figure 3A:
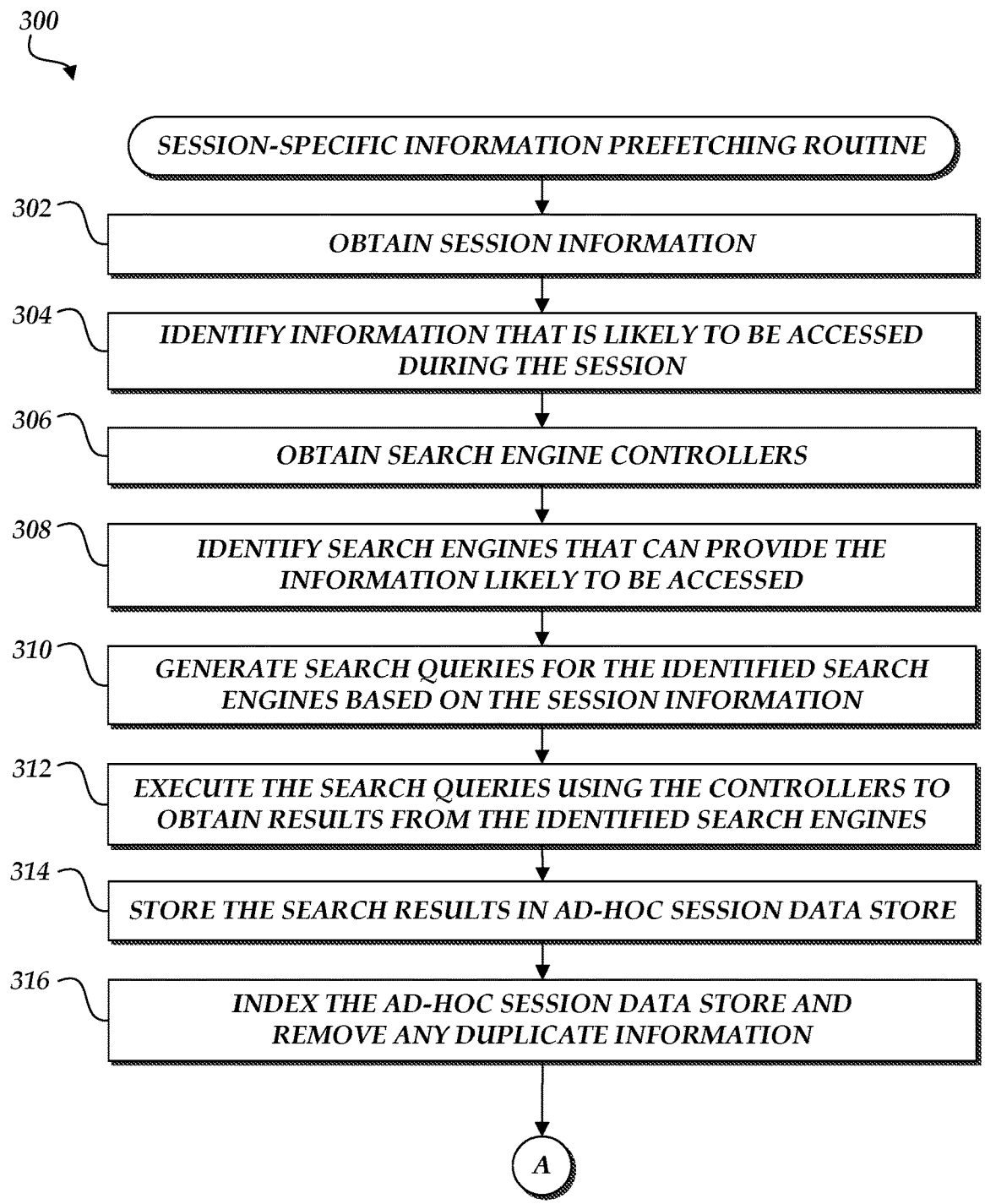
FIGS. 3A and 3B are flow diagrams depicting an example session data prefetching routine that may be implemented by a predictive session-based search engine in accordance with aspects of the present disclosure.
Figure 3B:
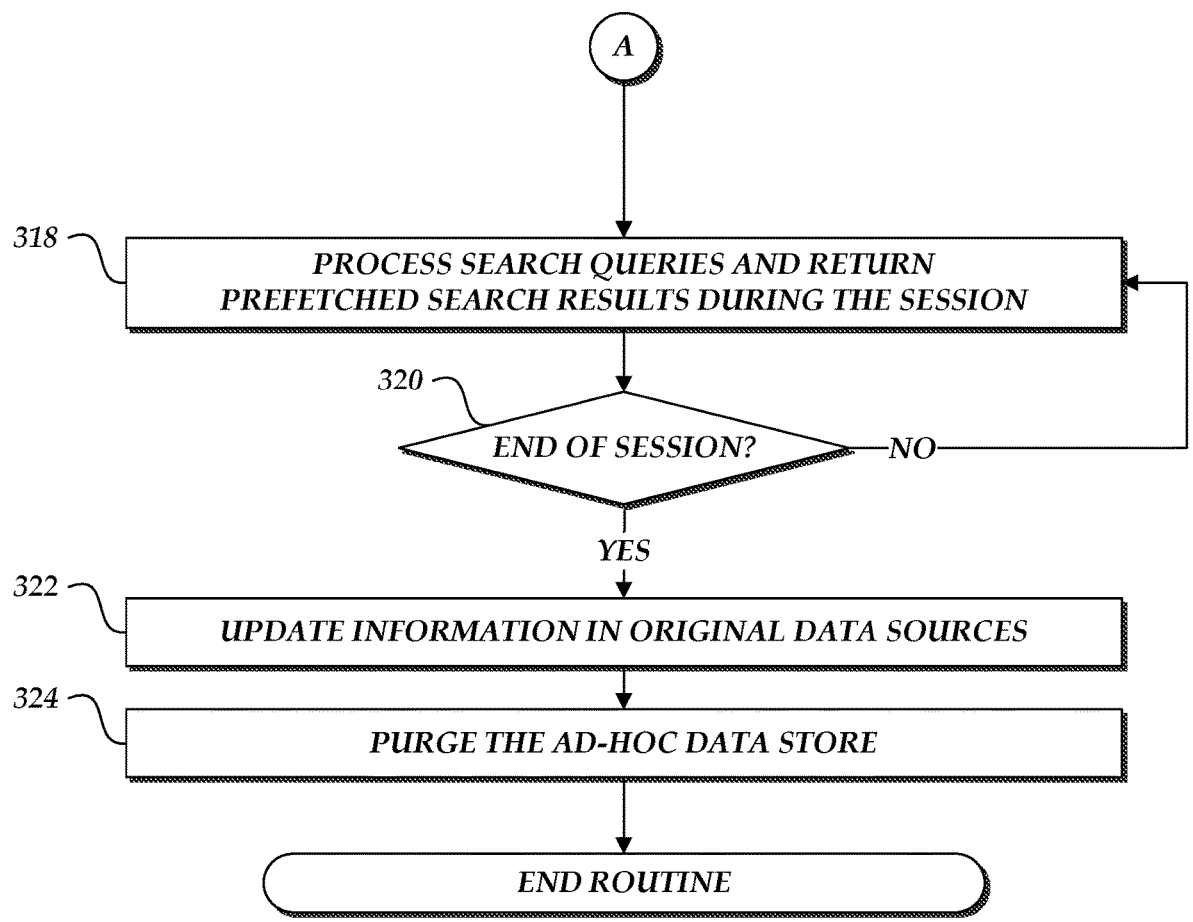

FIGS. 3A and 3B are flow diagrams depicting an example session data prefetching routine 300 that may be implemented in accordance with aspects of the present disclosure. The routine 300 may be implemented, for example, by the session data aggregation module 144 of FIG. 2 or by another module of the predictive session-based search engine 140. At block 302, information regarding a session may be obtained. In some embodiments, as described above, the information may be a session key, may authenticate a caller or account owner, or may otherwise indicate the start of a session. In other embodiments, the information regarding the session may be obtained after the session has begun, and may include information obtained at various points during the session. For example, audio information may be obtained during the session that identifies a reason or goal for the session, such as resolution of a technical support issue or cancellation of a subscription.

At block 304, information that is likely to be accessed during the session may be identified. Illustratively, the information likely to be accessed may be identified based on the information obtained at block 302. For example, if the information obtained at block 302 includes an account ID, then account information associated with that ID may be identified as information likely to be accessed during the session.

At block 306, one or more search engines may be identified. Illustratively, the search engines identified at block 306 may be search engines from which the information identified at block 304 can be obtained. For example, an account database may be identified as a source from which account information can be obtained, or a transaction database may be identified as a source of data regarding recent transactions. It will be understood that the illustrated routine 300 describes identifying and obtaining data from search engines as an example, and that the scope of the present disclosure includes identifying other data sources and obtaining data from them as described above.

At block 308, one or more search engine controllers may be obtained. As described above, a search engine controller obtained at block 308 may, in some embodiments, correspond to a search engine identified at block 306. In other embodiments, a controller obtained at block 308 may be associated with multiple search engines, or vice versa. The obtained search engine controller(s) may include various types of instructions for obtaining information from a search engine or engines. In some embodiments, blocks 306 and 308 may be combined. For example, the information identified at block 304 may be requested from all available search engine controllers, and individual controllers may determine whether to obtain all or part of the requested information from a search engine or engines associated with the controller.

At block 310, one or more of the search engine controllers may be used to generate search queries based on the session information obtained at block 302. For example, a search engine may be accessed using HTTP GET requests, and a query may thus be generated by generating an HTTP GET request that includes all or part of the session information (e.g., a request to obtain the resource "http://accountDB.example.com/search? acctID=12345"). As a further example, a relational database may be accessed using SQL commands, and the controller may generate an appropriate command (e.g., "select * from acct DB where acct ID='12345'"). In various embodiments, the controller may include a template into which session information may be inserted, a set of computer-executable instructions and further instructions for modifying them, instructions for customizing and transmitting an API call, or other information that enables generation of instructions that cause a search engine (or other data source) to provide specified information.

At block 312, the search queries generated at block 312 may be executed to obtain results from the search engines. For example, an HTTP request generated at block 312 may be transmitted to a web-based search engine, and the resulting HTTP response may be obtained. As a further example, an API call generated at block 312 may be transmitted to an API, and the resulting output may be obtained. In various embodiments, the search queries may be executed by the routine 400, by the search engines, or by combinations thereof. In some embodiments, the search queries may be executed in parallel and the search results obtained in parallel. By executing queries in parallel and obtaining search results in parallel, a predictive session-based search engine may reduce the latency associated with obtaining the search results and improve the efficiency of a computing device with regard to obtaining relevant search results during a particular session.

At block 314, the search results obtained at block 312 may be stored in an ad-hoc session data store, such as the ad-hoc session data store 146 of FIG. 2. In some embodiments, as described above, the ad-hoc session data store 146 may be a computer memory, whose use may further reduce latency and responsiveness. At block 316, the ad-hoc session data store may be indexed. Illustratively, the ad-hoc session data store may be indexed to identify relationships between data obtained from various sources. For example, transactions from a transaction database, or subscriptions from a subscription database, may be indexed to a particular account ID. In some embodiments, indexing the ad-hoc session data store may be unnecessary, and block 316 may be omitted. For example, a determination may be made that a caller is a first-time caller and no relevant data was obtained from existing data sources, or that all of the information obtained at block 312 relates to a particular account ID, and thus indexing by account ID is unnecessary. In other embodiments, the ad-hoc session data store may be indexed according to a determination of queries that are likely to be made during the session. For example, a determination may be made that transactions made within the past 30 days are likely to be the subject of a search query. A determination may thus be made that the ad-hoc session data store should be indexed by transaction date.

In some embodiments, the contents of the ad-hoc session data store may be further processed to remove any duplicate or redundant information. For example, multiple data stores may contain information regarding user subscriptions, and these data stores may each return overlapping information regarding the subscriptions. The routine 400 may thus consolidate the obtained search results to remove any redundancies, and may index them to enable faster responses to search queries.

Turning now to FIG. 3B, at block 318, search queries from a computing device (e.g., the agent computing device 120 of FIG. 2) may be obtained and processed. The search queries may be fulfilled with information from the ad-hoc session data store, which may enable retrieval of relevant information more quickly and efficiently than fulfilling the search queries with information from the original data sources. In some embodiments, search queries may be fulfilled with a combination of information from the ad-hoc session data store and the original sources. For example, frequently made queries may be fulfilled from the ad-hoc session data store, and relatively infrequent queries may be fulfilled from the original data sources. As described above, the information identified at block 304 may be identified or prioritized according to criteria such as a likelihood of retrieval, a frequency of retrieval, a performance cost associated with storing the information locally, a performance cost associated with retrieving the information from the original data sources, and the like.

At decision block 320, a determination may be made as to whether the current session has ended. As described above, in some embodiments, an explicit indication may be received that the session has ended, such as logging out of a server or terminating a phone call. In other embodiments, the determination at decision block 320 may be based on factors such as the time since the most recent query was executed, the length of the session, and so forth. If the determination at decision block 320 is that the session has not ended, then the routine 300 returns to block 318 and continues processing search queries until the session ends.

The routine 300 then branches to block 322, where, in some embodiments, information in the ad-hoc data store that was updated by the session may be output to the original data sources from which the data was obtained. For example, a caller to a customer service hotline may change the mailing address associated with an account, and the change may be stored in the ad-hoc data store for the length of the session. At the end of the session, the caller's mailing address may be updated in an account data store or other data store that contains account information. In some embodiments, block 322 may be carried out as needed during the session rather than being carried out at the end of the session, and information in the original data sources may thus be updated in parallel.

At block 324, the ad-hoc session data store may be purged. Illustratively, the data that was stored in the ad-hoc session data store at block 314 may be removed from the data store, marked as expired, or the resources associated with storing the data may otherwise be freed and made available. In some embodiments, as discussed above, the ad-hoc session data store may be implemented as a virtual device or in a computer memory, and may itself be deleted at the end of the session. The routine 300 then ends.

In various embodiments, the blocks of the routine 300 may be combined, omitted, or carried out in various orders. For example, blocks 306 and 308 may be combined, and the identity of the search engine from which data is obtained may be embedded in the controller rather than being separately identified by the routine 300. As a further example, as discussed above, a single search engine may be identified at block 306 as a source of at least a portion of the yet-to-be-obtained information, and the routine 300 may branch to block 306 and identify another search engine after a determination is made at decision block 318 that not all of the information has been obtained. Still further, block 326 may be omitted or may be carried out separately from the routine 300. The routine 300 is thus understood to be illustrative and not limiting.

Figure 4:
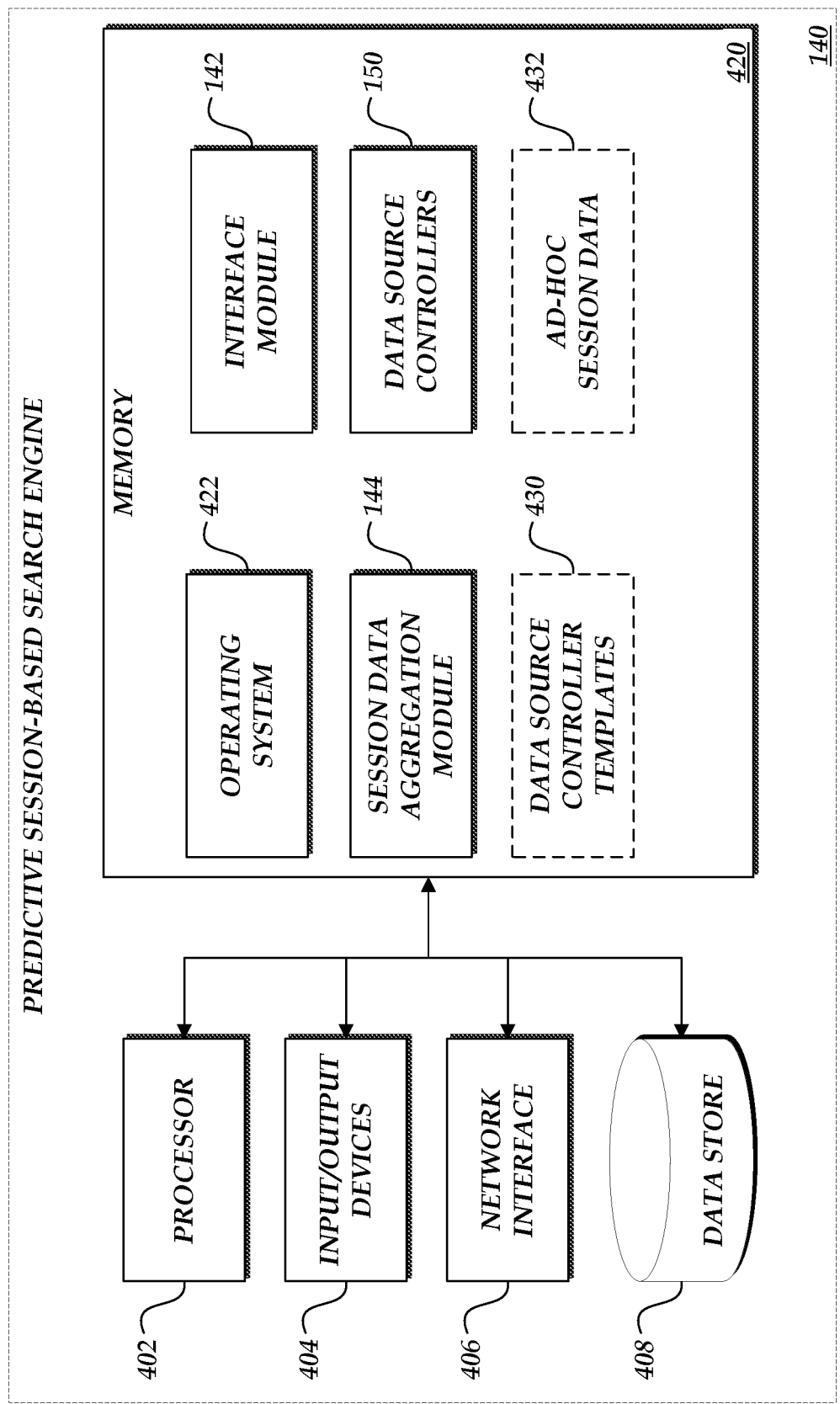
FIG. 4 is a block diagram depicting a general architecture of an example computing device for implementing a predictive session-based search engine in accordance with aspects of the present disclosure.

FIG. 4 depicts a general architecture of the predictive session-based search engine 140, which includes an arrangement of computer hardware and software components that may be used to implement aspects of the present disclosure. The predictive session-based search engine 140 may include many more (or fewer) elements than those shown in FIG. 4. It is not necessary, however, that all of these elements be shown in order to provide an enabling disclosure.

As illustrated, the predictive session-based search engine 140 includes a processor 402, input/output devices 404, a network interface 406, and a data store 408, all of which may communicate with one another by way of a communication bus 410. The network interface 406 may provide connectivity to one or more networks (such as the network 130 depicted in FIG. 2) or computing systems and, as a result, may enable the predictive session-based search engine 140 to receive and send information and instructions from and to other computing systems or services, such the agent computing device 120 or the search engines 152A-C depicted in FIG. 2. In some embodiments, the predictive session-based search engine 140 may be configured to process requests from the agent computing device 120, such as requests to initiate a new session, or to issue search queries or other requests to data sources.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the predictive session-based search engine 140. The memory 420 may further store specific computer-executable instructions and other information (which may be referred to herein as "modules") for implementing aspects of the present disclosure. For example, the memory 420 may include an interface module 142, which may perform various operations with regard to interfaces described herein. For example, the interface module 142 may generate user interfaces or application programming interfaces that enable communication with agent computing devices 120. The memory 420 may further include a session data aggregation module 144, which may implement aspects of the present disclosure such as carrying out the session data prefetching routine 300 depicted in FIG. 3. The memory 420 may still further include one or more data source controllers 150, which may perform various operations described herein with regard to obtaining information from data sources or updating information stored in data sources.

The memory 420 may further include data source controller templates 430 and ad-hoc session data 432, which may be loaded into the memory 420 as various operations are performed. In some embodiments, the data source controller templates 430 may be obtained from internal or external data stores (such as the template data store 148 of FIG. 2), either directly or via the network 130. In other embodiments, data source controller templates 430 may be obtained from the data store 408. Ad-hoc session data 432 may similarly be stored in internal or external data stores (such as the ad-hoc session data store 146 of FIG. 2), in the memory 420, or in the data store 408.

While the operating system 422, interface module 142, session data aggregation module 144, and data source controllers 150 are illustrated as distinct modules in the memory 420, in some embodiments, one or more of the interface module 142, session data aggregation module 144, and data source controllers 150 may be incorporated as a module in the operating system 422 or another application or module, and as such, separate modules may not be required to implement some embodiments.

It will be recognized that many of the components described in FIG. 4 are optional and that embodiments of the predictive session-based search engine 140 may or may not combine components. Furthermore, components need not be distinct or discrete. Components may also be reorganized. For example, the predictive session-based search engine 140 may be represented in a single physical device or, alternatively, may be split into multiple physical devices. In some embodiments, components illustrated as part of the predictive session-based search engine 140 (such as the interface module 142 or the data source controllers 150) may additionally or alternatively be included in other computing devices, such that some aspects of the present disclosure may be performed by the predictive session-based search engine 140 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
a data store configured to store search query templates, session information, and computer-executable instructions; and
a processor in communication with the data store, wherein the computer-executable instructions, when executed by the processor, configure the processor to:
receive, from a computing device associated with a customer service agent, a session key that authenticates a session with a customer;
identify, based at least in part on the session key, session information that is likely to be accessed during the session;
obtain, from the data store, a first search query template corresponding to a first search engine;
generate a first search query based at least in part on the first search query template and the session key;
execute the first search query to obtain, as search results, a first portion of the session information from the first search engine;
obtain, from the data store, a second search query template corresponding to a second search engine;
generate a second search query based at least in part on the second search query template and the session key;
execute the second search query to obtain, as search results, a second portion of the session information from the second search engine;
store the first and second portions of the session information in the data store;
receive, from the computing device associated with the customer service agent, a customer service agent search query;
obtain, from the data store, a subset of the session information that is responsive to the customer service agent search query; and
transmit the subset of the session information to the computing device associated with the customer service agent.

2. The system of claim 1, wherein the processor is further configured to index the session information.

3. The system of claim 1, wherein the processor is further configured to determine a set of search engines from which to obtain the session information.

4. The system of claim 1, wherein the processor is further configured to identify the second search engine based at least in part on search results obtained from the first search engine.

5. The system of claim 1, wherein the first search query and the second search query are executed in parallel.

6. A computer-implemented method comprising:
under control of a computing device configured with specific computer-executable instructions,
obtaining, by the computing device, session key information authenticating a session;
identifying, by the computing device, session data that is likely to be accessed during the session;
obtaining, by the computing device, a first set of computer-executable instructions enabling access to a first data source, the first set of computer-executable instructions corresponding to a first query template;
generating, by the computing device, a first search query based at least in part on the first set of computer-executable instructions and at least a first portion of the session key information;
executing, by the computing device, the first search query to obtain a first set of data from the first data source;
obtaining, by the computing device, a second set of computer-executable instructions associated with a second data source, the second set of computer-executable instructions corresponding to a second query template;
generating, by the computing device, a second search query based at least in part on the second set of computer-executable instructions and at least a second portion of the session key information;
executing, by the computing device, the second search query to obtain a second set of data from the second data source;
aggregating, by the computing device, the first and second sets of data to form the session data; and
transmitting, by the computing device, at least a portion of the session data in response to a session data search query from a client computing device.

7. The computer-implemented method of claim 6, wherein generating the first search query comprises modifying the first set of computer-executable instructions based at least in part on the session key information authenticating the session.

8. The computer-implemented method of claim 6, wherein configuring the first set of computer-executable instructions comprises populating a template with at least a portion of the session key information authenticating the session.

9. The computer-implemented method of claim 6 further comprising storing the session data in an ad-hoc session data store.

10. The computer-implemented method of claim 9, wherein the ad-hoc session data store comprises a cache.

11. The computer-implemented method of claim 9 further comprising:
receiving, by the computing device, an indication from the client computing device that the session has ended; and
purging the session data from the ad-hoc session data store.

12. The computer-implemented method of claim 6, wherein purging the session data from the ad-hoc session data store comprises marking the session data invalid.

13. The computer-implemented method of claim 6 further comprising:
receiving, by the computing device, an update to at least a portion of the first set of data; and
executing, by the computing device, a third set of computer-executable instructions to cause the first data source to store the update.

14. The computer-implemented method of claim 6, wherein the session key corresponds to an index of the first data source.

15. The computer-implemented method of claim 14, wherein the session key comprises one or more of an account identifier, transaction identifier, client identifier, payment method identifier, or subscription identifier.

16. A system comprising:
a data store configured to store computer-executable instructions; and
a processor in communication with the data store, wherein the computer-executable instructions, when executed by the processor, configure the processor to:
obtain session key information associated with a session;
identify, based at least in part on the session key information associated with the session, session data that is likely to be accessed during the session;
identify, based at least in part on the session data that is likely to be accessed, a first data source and a second data source, wherein the first data source and the second data source each contain at least a portion of the session data;
generate, based at least in part on a first query template and at least a first portion of the session key information, a first query;
execute the first query to obtain a first portion of the session data from the first data source;
generate, based at least in part on a second query template and at least a second portion of the session key information, a second query;
execute the second query to obtain a second portion of the session data from the second data source;
aggregate the first portion and the second portion to form the session data; and
transmit at least a subset of the session data to a computing device associated with the session.

17. The system of claim 16, wherein the at least a subset of the session data is transmitted in response to a search query received from the computing device.

18. The system of claim 16, wherein the processor configured to obtain the first portion of the session data from the first data source is configured to:
obtain a first set of computer-executable instructions associated with the first data source;
configure the first set of computer-executable instructions based at least in part on the session key information; and
execute the first set of computer-executable instructions to obtain the first portion of the session data.

19. The system of claim 18, wherein the processor is configured to obtain the first portion of the session data and the second portion of the session data in parallel.

20. The system of claim 18, wherein the session data that is likely to be accessed during the session is determined based at least in part on a previous session.

* * * * *

UNITED STATES PATENT AND TRADEMARK OFFICE
CERTIFICATE OF CORRECTION

PATENT NO. : 10,572,531 B1
APPLICATION NO. : 15/793803
DATED : February 25, 2020
INVENTOR(S) : Abhinav Tiwari et al.

Page 1 of 1

It is certified that error appears in the above-identified patent and that said Letters Patent is hereby corrected as shown below:

In the Claims

Column 18, Line 55, Claim 12, change "claim 6" to --claim 11--.

Signed and Sealed this
Twenty-second Day of September, 2020

Andrei Iancu
*Director of the United States Patent and Trademark Office*